United States Patent
Shaikh et al.

(10) Patent No.: US 10,951,497 B2
(45) Date of Patent: Mar. 16, 2021

(54) SYSTEM AND METHOD FOR A SERVICE-BASED INTERFACE ARCHITECTURE

(71) Applicant: Verizon Patent and Licensing Inc., Arlington, VA (US)

(72) Inventors: Imtiyaz Shaikh, Irving, TX (US); Maria G. Lam, Oakland, CA (US); Maqbool Chauhan, Keller, TX (US); Jerry Steben, Fort Worth, TX (US); David Taft, Keller, TX (US); John P. Demko, McDonald, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 16/126,238

(22) Filed: Sep. 10, 2018

(65) Prior Publication Data

US 2020/0084127 A1    Mar. 12, 2020

(51) Int. Cl.
*H04L 12/26* (2006.01)

(52) U.S. Cl.
CPC ............. *H04L 43/06* (2013.01); *H04L 43/08* (2013.01)

(58) Field of Classification Search
CPC ................................ H04L 43/06; H04L 43/08
See application file for complete search history.

(56) References Cited

U.S. PATENT DOCUMENTS

| | | | |
|---|---|---|---|
| 10,277,529 B2* | 4/2019 | McClean | H04L 47/781 |
| 2002/0124061 A1* | 9/2002 | Mossman | G07F 19/211 |
| | | | 709/220 |
| 2007/0121801 A1* | 5/2007 | Montoya | H04M 3/303 |
| | | | 379/37 |
| 2009/0247159 A1* | 10/2009 | Flore | H04W 24/02 |
| | | | 455/434 |
| 2016/0286410 A1* | 9/2016 | O'Malley | H04W 24/02 |
| 2017/0195900 A1* | 7/2017 | Nekuii | H04W 24/02 |
| 2018/0062776 A1* | 3/2018 | Teshima | H04W 56/0005 |
| 2018/0139106 A1* | 5/2018 | Senarath | H04L 67/16 |
| 2019/0372900 A1* | 12/2019 | Chen | H04L 41/5019 |
| 2020/0084127 A1* | 3/2020 | Shaikh | H04L 43/06 |

* cited by examiner

*Primary Examiner* — Uzma Alam

(57) ABSTRACT

A device may configure a centralized performance indicator data store for a plurality of network function devices included in a telecommunications system. The centralized performance indicator data store may be accessible by the plurality of network function devices on a management bus of the telecommunications system via a service-based interface. The device may subscribe the centralized performance indicator data store to a message class associated with performance indicator data that is generated by the plurality of network function devices. The device may receive, from the plurality of network function devices, one or more published communications associated with the message class. The one or more published communications may include the performance indicator data. The device may store the performance indicator data in the centralized performance indicator data store.

20 Claims, 5 Drawing Sheets

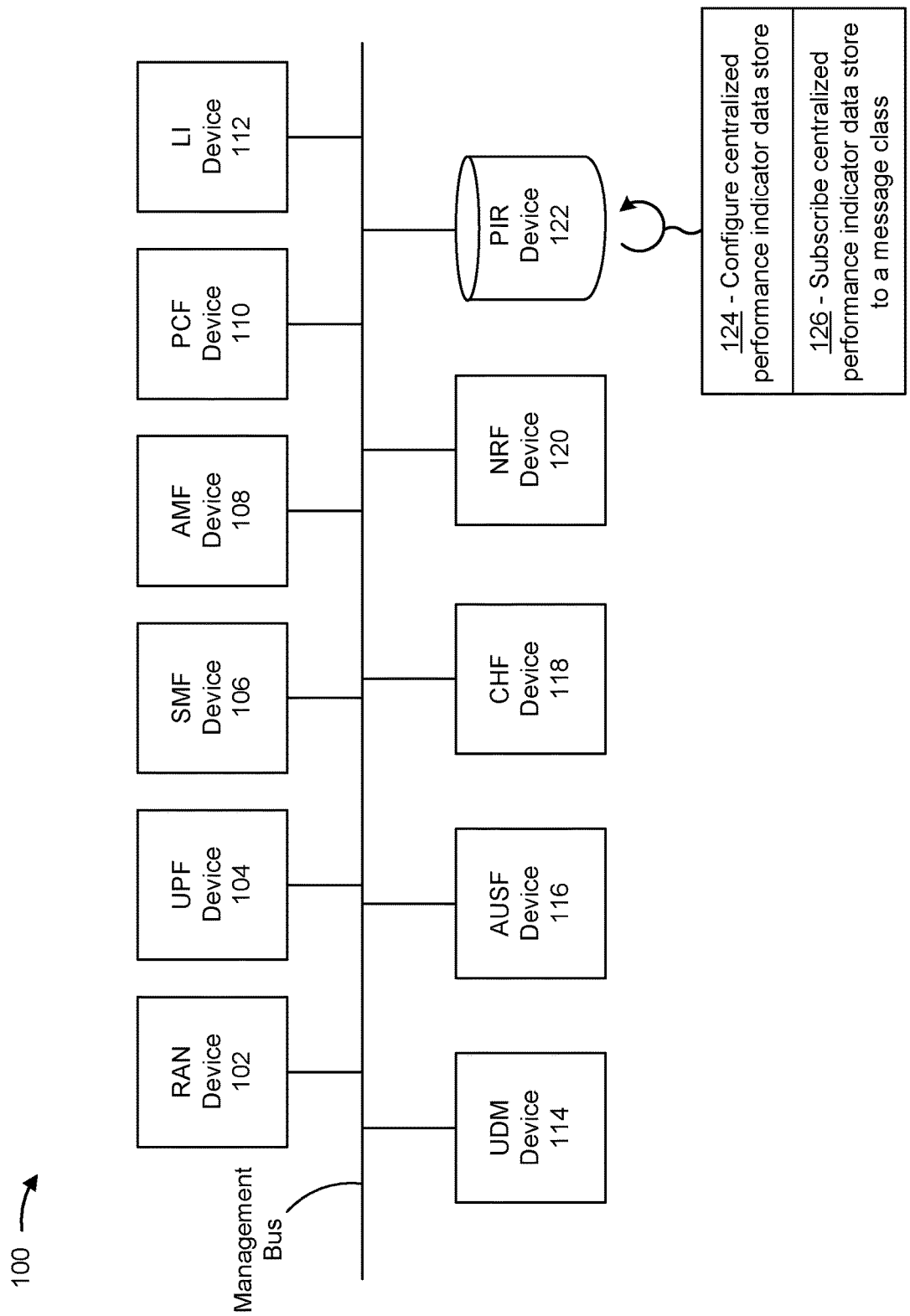

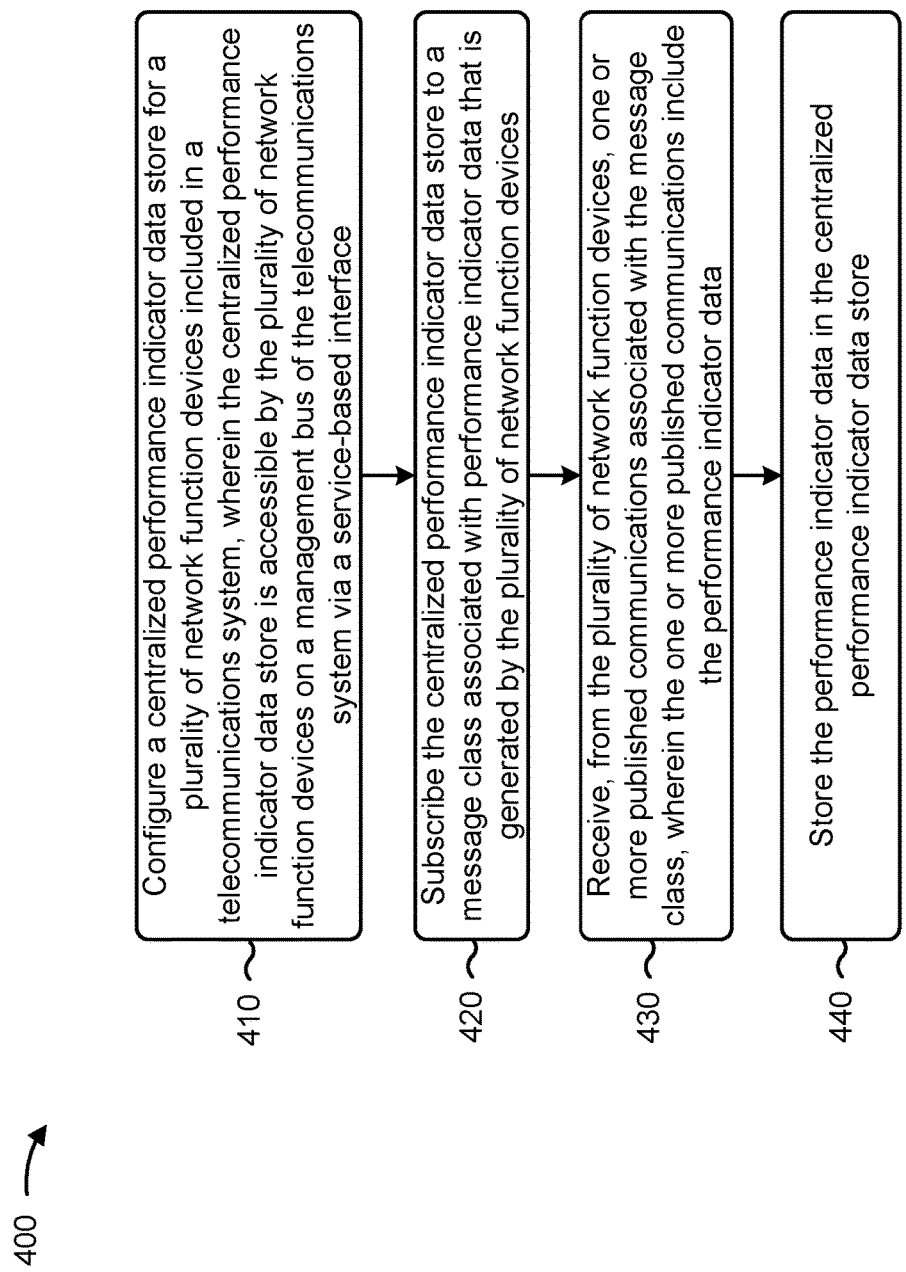

SYSTEM AND METHOD FOR A SERVICE-BASED INTERFACE ARCHITECTURE

BACKGROUND

5G/New Radio (5G/NR) may provide various enhancements to wireless communications, such as slicing, flexible bandwidth allocation, improved spectral efficiency, ultra-reliable low-latency communications (URLLC), beamforming, high-frequency such as the millimeter-wave (mmWave) and/or Sub-6 GHz communication.

BRIEF DESCRIPTION OF THE DRAWINGS

FIGS. 1A and 1B are diagrams of an example implementation described herein.

FIG. 4 is a flow chart of an example process for performance indicator data retrieval and storage using a service-based interface.

DETAILED DESCRIPTION OF PREFERRED EMBODIMENTS

Figure 1B:
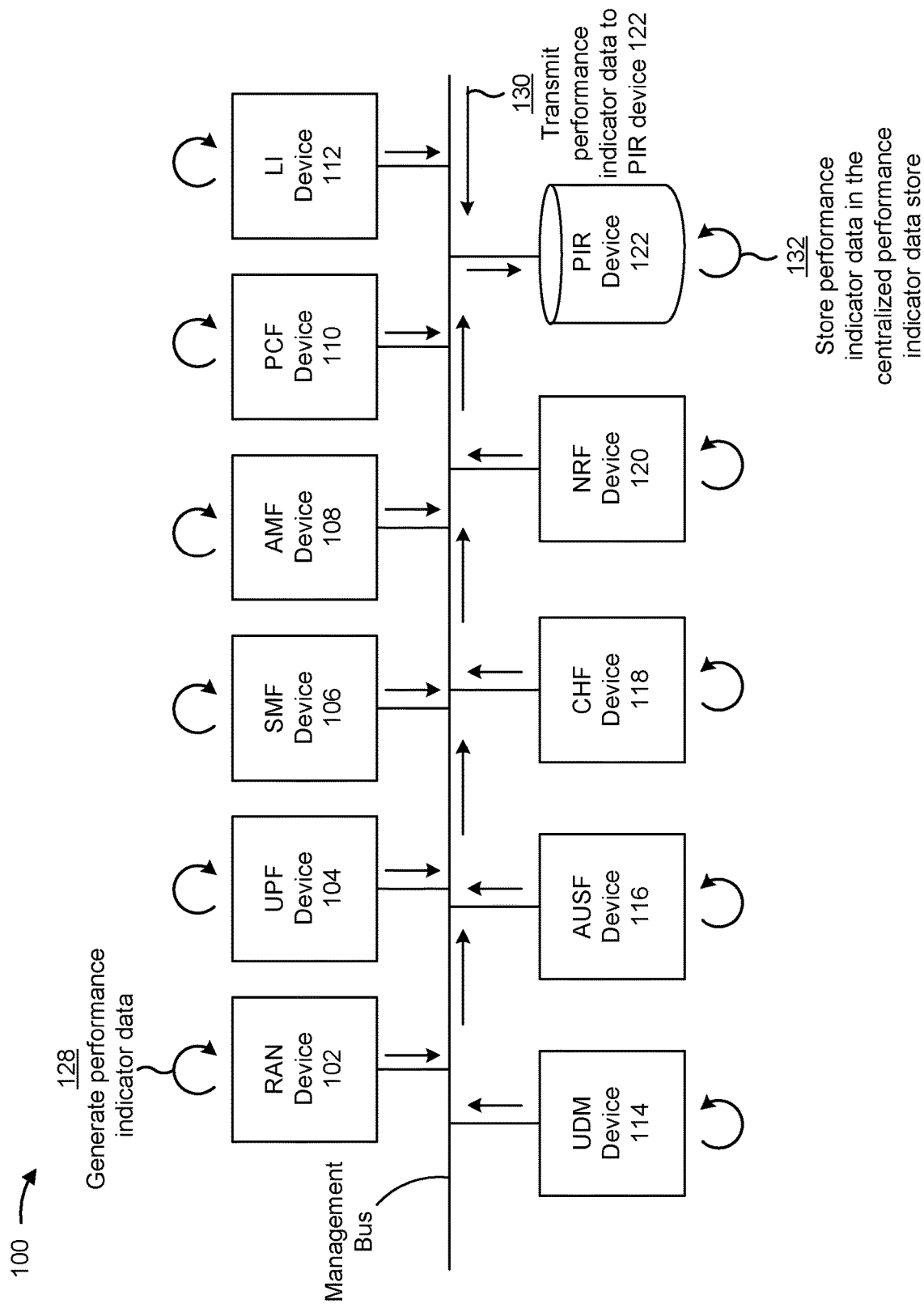

The following detailed description of example implementations refers to the accompanying drawings. The same reference numbers in different drawings may identify the same or similar elements.

A telecommunications system, such as a 5G wireless telecommunications network, may include a plurality of network function devices, such as a user plane function (UPF) device, a session management function (SMF) device, and/or the like. In operation of the telecommunications system, the plurality of network functions may generate performance indicator data associated with one or more performance indicators. In some cases, in order to obtain and make use of performance indicator data generated by a network function device, a network operator of the telecommunications system may utilize an element management system to manage the network function device. The element management system may obtain the performance indicator data, from the network function device, on a proprietary interface associated with the network function device.

In some cases, the plurality of network function devices may be provided by a plurality of different vendors. In some cases, each vendor, of the plurality of different vendors, may use a different proprietary interface to retrieve and provide performance indicator data. In some cases, a network function device may use a plurality of different proprietary interfaces to retrieve and provide performance indicator data. As a result, the network operator may have to utilize a plurality of different element management systems in the telecommunications system in order to obtain and use performance indicator data generated by the plurality of network function devices. These different element management systems may lack integration and/or stitching with each other, which may not provide the network operator with an end-to-end view when troubleshooting problems. This increases the complexity of the telecommunications system, increases the complexity of operating the telecommunications system, increases storage requirements, resource requirements, and/or the like. Moreover, the different element management systems may compare, analyze, and generally handle and process performance indicator data, which results in inefficiencies when using the performance indicator data to troubleshoot issues in the telecommunications system.

Some implementations described herein provide a performance indicator repository (PIR) device capable of configuring a centralized performance indicator data store that may be accessible by a plurality of network function devices, on a management bus of the telecommunications system, via a service-based interface. The PIR device may subscribe the centralized performance indicator data store to a message class associated with performance indicator data that is generated by the plurality of network function devices. The PIR device may receive, from the plurality of network function devices, one or more published communications associated with the message class. The one or more published communications may include the performance indicator data. The PIR device may store the performance indicator data in the centralized performance indicator data store.

In this way, the PIR device reduces or eliminates the need for the network operator to include a plurality of element management systems in the telecommunications system to manage the plurality of network function devices, which decreases the complexity of the telecommunications system, decreases the complexity of operating and maintaining the telecommunications system, and/or the like. Moreover, storing the performance indicator data generated by the plurality of network function devices in a centralized way reduces distributed storage requirements and allows the PIR device and/or another device to use the performance indicator data to identify and/or troubleshoot issues in the telecommunications system, to optimize one or more operating parameters of the telecommunications system, and/or the like.

FIGS. 1A and 1B are diagrams of an example implementation 100 described herein. Example implementation 100 illustrates various portions of a telecommunications system. As shown in FIGS. 1A and 1B, the telecommunications system may include a plurality of network function devices, such as a radio access network (RAN) device 102, a user plane function (UPF) device 104, a session management function (SMF) device 106, an access and mobility management function (AMF) device 108, a policy control function (PCF) device 110, a lawful intercept (LI) device 112, a unified data management (UDM) device 114, an authentication server function (AUSF) device 116, a charging function (CHF) device 118, a network repository function (NRF) device 120, and/or the like; may include a performance indicator repository (PIR) device 122; and/or the like.

In some implementations, some network function devices, of the plurality of network function devices, may use a proprietary interface, such as an operations, administration, and maintenance (OAM) interface for messaging in the mobile network and/or retrieving performance indicator data generated by the network function devices. In some implementations, some of the network function devices may use different proprietary interfaces. For example, the PCF device 110 may use a first proprietary interface and UDM device 114 may use a second proprietary interface; SMF device 106 and AMF device 108 may use the same proprietary interface, and/or the like. In some implementations, the plurality of network function devices may be implemented on physical devices, such as a gateway, a mobility management entity, and/or the like. In some implementations, the hardware and/or software implementing the plurality of network function devices may be virtualized (e.g., through the use of network function virtualization and/or software-defined networking), thereby allowing for the use of composable infrastructure when implementing the plurality of network function devices. In this way, networking, storage, and compute resources may be allocated to implement the functions of the plurality of network function devices in a flexible manner as opposed to relying on dedicated hardware and software to implement these functions.

In some implementations, the plurality of network function devices may be communicatively connected via a management bus. The management bus may include a communication structure that allows the various network function devices to share management information, such as performance indicator information. In some implementations, the plurality of network function devices may communicate on the management bus via a service-based interface. The service-based interface may include a representational state transfer (RESTful) application programming interface (API) that utilizes hypertext transfer protocol (HTTP) and/or another transfer protocol for requesting and transmitting data in various structured formats, such as JavaScript Object Notation (JSON), extensible markup language (XML), and/or the like.

RAN device 102 may provide a coverage area for communications in a geographic area. In some implementations, RAN device 102 may include various types of base stations. A user equipment (UE) (e.g., a device equipped with a wireless telecommunications interface) within the coverage area of RAN device 102 may communicate with RAN device 102, and RAN device 102 may communicate with the UE within the coverage area. In some implementations, RAN device 102 may receive data from the UE in the coverage area, and may transmit the data to other devices in the telecommunications system.

UPF device 104 may communicatively connect RAN device 102 (and therefore the UE) to one or more data networks included in, and/or external to, the telecommunications system. UPF device 104 may receive one or more packets from the UE, may apply one or more rules to the one or more packets to process the one or more packets, may transmit the packets to the one or more data networks, and/or the like. SMF device 106 may establish, modify, and/or terminate a communications session for the UE in the telecommunications system. For example, SMF device 106 may assign an address (e.g., an Internet protocol (IP) address) to the UE during establishment of the communications session, may release the address from the UE during termination of the communications session, and/or the like. AMF device 108 may manage the registration of the UE with RAN device 102, may monitor the UE's location in the telecommunications system, may manage the UE's reachability in the telecommunications system, and/or the like.

PCF device 110 may generate one or more rules for the communications session associated with the UE. The one or more rules may include a session management rule (e.g., any of the session management rules described above) that are to be applied by SMF device 106, one or more mobility management rules (e.g., a service continuity rule, such as a rule that controls how packets are handled when an IP address changes during the communications session, a session continuity rule, such as a rule that controls how the communications session is to be maintained as the UE moves geographically throughout the telecommunications system, etc.), and/or the like.

LI device 112 may generate one or more rules that are to be applied by UPF device 104 for lawful intercept of packets. For example, LI device 112 may generate a rule that specifies packets transmitted by a UE associated with a particular subscriber are to be intercepted, may generate a rule that specifies packets associated with a particular application are to be intercepted, and/or the like. UDM device 114 may store a subscriber profile associated with the UE, may store subscription information associated with the subscriber profile, may generate authentication and key agreement (AKA) credentials for the UE, and/or the like. AUSF device 116 may include an authentication server and may support the process of authenticating the UE in the telecommunications system.

CHF device 118 may track resource usage associated with the UE in the telecommunications system as reported by UPF device 104 for billing purposes. NRF device 120 may store information associated with the various network function devices included in the telecommunications system. A network function device, of the plurality of network function devices, may use NRF device 120 to identify another network function device, of the plurality of network function devices, and may communicate with the other network function device over the management bus.

PIR device 112 may store performance indicator data associated with the various network function devices included in the telecommunications system. The performance indicator data may include data associated with various types of performance indicators. In some implementations one or more performance indicators may be associated with a particular type of network function device. For example, one or more performance indicators associated with RAN device 102 may include a reachability performance indicator (e.g., that indicates whether and how reachable one or more base stations included in RAN device 102 are to UEs in the telecommunications system), a mobility performance indicator (e.g., that quantifies the ability of RAN device 102 to allow the UEs to move and continue service in the telecommunications system), a latency performance indicator (e.g., that indicates an average roundtrip time between a base station and a UE in the telecommunications system), and/or the like. As another example, one or more performance indicators associated with UPF device 104 may include a throughput performance indicator (e.g., that indicates a data rate of packets transmitted through UPF device 104), a packet loss performance indicator (e.g., that specifies a quantity of packets that are dropped at UPF device 104, that specifies a rate of packets that are dropped at UPF device 104 (e.g., a quantity of dropped packets over a particular time period), etc.), and/or the like. As a further example, a performance indicator associated with LI device 112 may include an interception performance indicator (e.g., a quantity of packets intercepted by LI device 112, a percentage of packets transmitted through the telecommunications system that is intercepted by LI device 112. As another example, a performance indicator associated with CHF device 118 may include a network resource usage performance indicator (e.g., an amount of network resources used per UE in the telecommunications system).

In some implementations, one or more common performance indicators may be associated with a plurality of network function devices. For example, the one or more common performance indicators may include a reliability performance indicator (e.g., a performance indicator that indicates an amount of uptime of a particular network function device), a usage performance indicator (e.g., a performance indicator that indicates a usage of a service, provided by a particular network function device, by other network function devices in the telecommunications system), a device resource usage performance indicator (e.g., a performance indicator that indicates memory resource usage, processing resource usage, and/or the like, of a particular network function device), and/or the like.

Turning to FIG. 1A, and as shown by reference number 124, PIR device 122 may configure a centralized performance indicator data store to receive, store, and or use performance indicator data generated by the plurality of network function devices. The centralized performance indicator data store may include a data structure, such as a database, a file system, one or more electronic files, and/or the like; may include a device, such as a memory device, a storage device, and/or the like; and/or the like that is configured to store performance indicator data.

In some implementations, to configure the centralized performance indicator data store, PIR device 122 may generate and transmit a notification that indicates that the centralized performance indicator data store is available for use, in the telecommunications system, to store performance indicator data generated by the plurality of network function devices. For example, PIR device 122 may transmit the notification to NRF device 120 such that the plurality of network function devices may use the NRF device 120 to become aware of the centralized performance indicator data store. As another example, PIR device 122 may transmit the notification to the plurality of network function devices, such as via the management bus.

As further shown in FIG. 1A, and as shown by reference number 126, PIR device 122 may subscribe the centralized performance indicator store to a message class. In some implementations, the plurality of network function devices may communicate on the management bus using various communication techniques, such as a publish-subscribe technique, a message queue technique, and/or the like. The communication techniques may be implemented in the telecommunications system using a message-oriented middleware system and/or another type of system(s) and/or device(s).

When implementing a publish-subscribe technique, a network function device that transmits a communication in the telecommunications system (which may be referred to as a publisher) may publish the communication to a message broker device (e.g., a device executing a Java message service and/or the like) and/or another device instead of transmitting the communication directly to the receiver of the communication. The published communication may be associated with a message class of a plurality of message classes, such as a performance indicator data message class (e.g., a message class associated with performance indicator data generated by the plurality of network function devices), an event message class (e.g., a message class associated with one or more events that occur in the telecommunications system), an instruction message class (e.g., a message class associated with providing instructions to execute various actions in the telecommunications system), and/or the like.

A network function device may subscribe to one or more message classes to receive published communications associated with the one or more message classes. For example, PIR device 122 may subscribe the centralized performance indicator data store to the performance indicator data message class to receive published communications associated with performance indicator data generated by the plurality of network function devices. In this way, the plurality of network functions may publish communications associated with the performance indicator by transmitting the communications to the message broker device, and the message broker device may transmit, based on determining that PIR device 122 is subscribed to the performance indicator data message class, the published communications to PIR device 122.

When implementing a message queue technique, a network function device may publish a communication to a particular message queue device (e.g., a device that is configured to store the published communication in a message queue) and/or another device instead of transmitting the communication directly to the receiver of the communication. A network function device may monitor the message queue to determine whether the published communication has been added to the message queue. Based on determining that the published communication has been added to the message queue, the network function device may request the message queue device to transmit the published communication to the network function device. In this way, the plurality of network functions may publish communications associated with the performance indicator by transmitting the communications to the message queue device, and the message queue device may store the published communications in a message queue associated with performance indicator data. PIR device 122 may monitor the message queue and may determine that the published communications have been added to the message queue. PIR device 122 may transmit a request, to the message queue device, for the published communications, and the message queue device may transmit the published communications to PIR device 122 based on receiving the request.

As shown in FIG. 1B, and by reference number 128, the plurality of network function devices may generate performance indicator data. For example, the plurality of network function devices may be configured to generate the performance indicator data via a hardware configuration, a software configuration, and/or the like.

As further shown by FIG. 1B, and as shown by reference number 130, the plurality of network function devices may transmit the performance indicator data to PIR device 122. In some implementations, the plurality of network function devices may continuously transmit the performance indicator data (e.g., as the performance indicator data is generated), may periodically transmit the performance indicator data in batches at particular time intervals, may transmit the performance indicator data based on receiving a request (e.g., from PIR device 122) for the performance indicator data, and/or the like.

In some implementations, the plurality of network function devices may transmit the performance indicator data, to PIR device 122, in one or more published communications on the management bus. For example, the plurality of network function devices may transmit the one or more published communications on the management bus via the service-based interface, which may include a RESTful API. While examples are described herein refer to the use of a RESTful API, other types of APIs may be used, such as a simple object access protocol (SOAP) API, a Falcor API, and/or the like.

As explained above, the plurality of network function devices may use a different operations, administration, and maintenance (OAM) interface to retrieve the performance indicator data and to transmit the performance indicator data in one or more published communications. For example, two or more network function devices may different OAM interfaces for each of the two or more network function devices. In some implementations, a network function device may use a plurality of different OAM interfaces to retrieve performance indicator data. The RESTful API may allow the plurality of network functions to transmit the one or more published communications to PIR device 122 in a unified way. For example, the RESTful API may use a uniform set of HTTP commands, a uniform set of file types, and/or the like, which allow the plurality of network functions to communicate with each other on the management bus in a uniform way while allowing the plurality of network function devices to continue to use proprietary OAM interfaces for performance indicator data retrieval.

A network function device, of the plurality of network function devices, may retrieve performance indicator data stored at the network function device (e.g., using one or more bulk statistics commands and/or the like) and may publish one or more communications on the management bus via the RESTful API using the respective OAM interface associated with the network function device. In some implementations, the network function device may publish the performance indicator data by publishing a resource identifier that identifies a location of the performance indicator data, such as a uniform resource locator (URL), a uniform resource identifier (URI), a uniform resource name (URN), and/or the like. In this way, the RESTful API provides a common interface for the plurality of network functions to communicate with PIR device 122, even when the plurality of network functions uses different OAM interfaces. This increases compatibility and interoperability of the different OAM interfaces with PIR device 122, which in turn decreases the complexity of operating and maintaining the telecommunications system.

In some implementations, the plurality of network function devices may transmit the performance indicator data to another device (e.g., a message broker device, a message queue device, and/or the like) in one or more published communications (e.g., using a HTTP POST command, using a HTTP PUT command, and/or the like), and the other device may transmit the one or more published communications to PIR device 122. For example, the other device may automatically transmit the one or more published communications to PIR device 122 based on PIR device 122 being subscribed to a performance indicator data message class. As another example, the other device may transmit a notification, to PIR device 122, that the performance indicator data is available in a message queue, and may transmit the performance indicator data, to PIR device 122, based on receiving a request for the performance indicator data (e.g., a HTTP GET command). In some implementations, the request may include a HTTP GET request that identifies a resource identifier (e.g., URL, URI, URN, and/or the like) associated with the performance indicator data.

In some implementations, PIR device 122 may receive the performance indicator data in various forms. For example, PIR device 122 may receive the performance indicator data in a structured electronic file format, such as an extensible markup language (XML) format, a JavaScript Object Notation (JSON) format, and/or the like. In some implementations, PIR device 122 may receive the performance indicator data in an unstructured electronic file format, such as a text format.

As further shown by FIG. 1B, and as shown by reference number 132, PIR device 122 may store the performance indicator data in the centralized performance indicator data store. In some implementations, PIR device 122 may store performance indicator data based on a network function device that generated and transmitted the performance indicator data. For example, PIR device 122 may store performance indicator data, generated and transmitted by UDM device 114, in a first location in the centralized performance indicator data store, may store performance indicator data, generated and transmitted by AUSF device 116, in a second location in the centralized performance indicator data store, and so on. In some implementations, PIR device 122 may store performance indicator data by performance indicator. For example, PIR device 122 may store performance indicator data, associated with a latency performance indicator, in a first location in the centralized performance indicator data store, may store performance indicator data, associated with a throughput performance indicator, in a second location in the centralized performance indicator data store, and so on.

In some implementations, PIR device 122 may use the performance indicator data, stored in the centralized performance indicator data store, to perform various actions, may transmit the performance indicator data to another device that performs various actions using the performance indicator data, and/or the like. For example, PIR device 122 may use the performance indicator data to perform call modelling in the telecommunications system. For example, PIR device 122 may model how the telecommunications system may handle calls (e.g., made by one or more UEs in the telecommunications system, received by one or more telecommunications system, and/or the like) based on proposed modifications to one or more operating parameters to the telecommunications system. As another example, PIR device 122 may use the performance indicator data to modify one or more operating parameters of the telecommunications system (e.g., may cause one or more of the network function devices to change one or more operating parameters), may perform operations modelling to determine how the telecommunications may perform based on proposed modifications to one or more operating parameters of the telecommunications system, and/or the like. For example, PIR device 122 may use performance indicator data associated with a reachability performance indicator to adjust one or more coverage areas provided in the telecommunications system by RAN device 102 to increase reachability in the telecommunications system. As another example, PIR device 122 may filter the performance indicator data to generate a performance indicator data report. For example, PIR device 122 may filter the performance indicator data based on a common performance indicator (e.g., a reliability performance indicator) to generate a report (e.g., an electronic document, an interactive report, and/or the like) associated with the common performance indicator. In this way, PIR device 122 may be capable of visualizing the performance indicator data associated with the common performance indicator, such that the performance indicator data generated by the plurality of network device may be compared, may be analyzed, may be used to identify and correct anomalies with the performance of one or more network function devices, and/or the like.

In this way, PIR device 122 reduces or eliminates the need for the network operator of the telecommunications system to include a plurality of element management systems in the telecommunications system to manage the plurality of network function devices, which decreases the complexity of the telecommunications system, decreases the complexity of operating and maintaining the telecommunications system, and/or the like. Moreover, storing the performance indicator data generated by the plurality of network function devices in a centralized way allows PIR device 122 and/or another device to use the performance indicator data to identify and/or troubleshoot issues in the telecommunications system, to optimize one or more operating parameters of the telecommunications system, and/or the like.

The number and arrangement of devices shown in FIGS. 1A and 1B are provided as an example. In practice, there may be additional devices and/or networks, fewer devices and/or networks, different devices and/or networks, or differently arranged devices and/or networks than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices of implementation 100 may perform one or more functions described as being performed by another set of devices of implementation 100.

Figure 2:
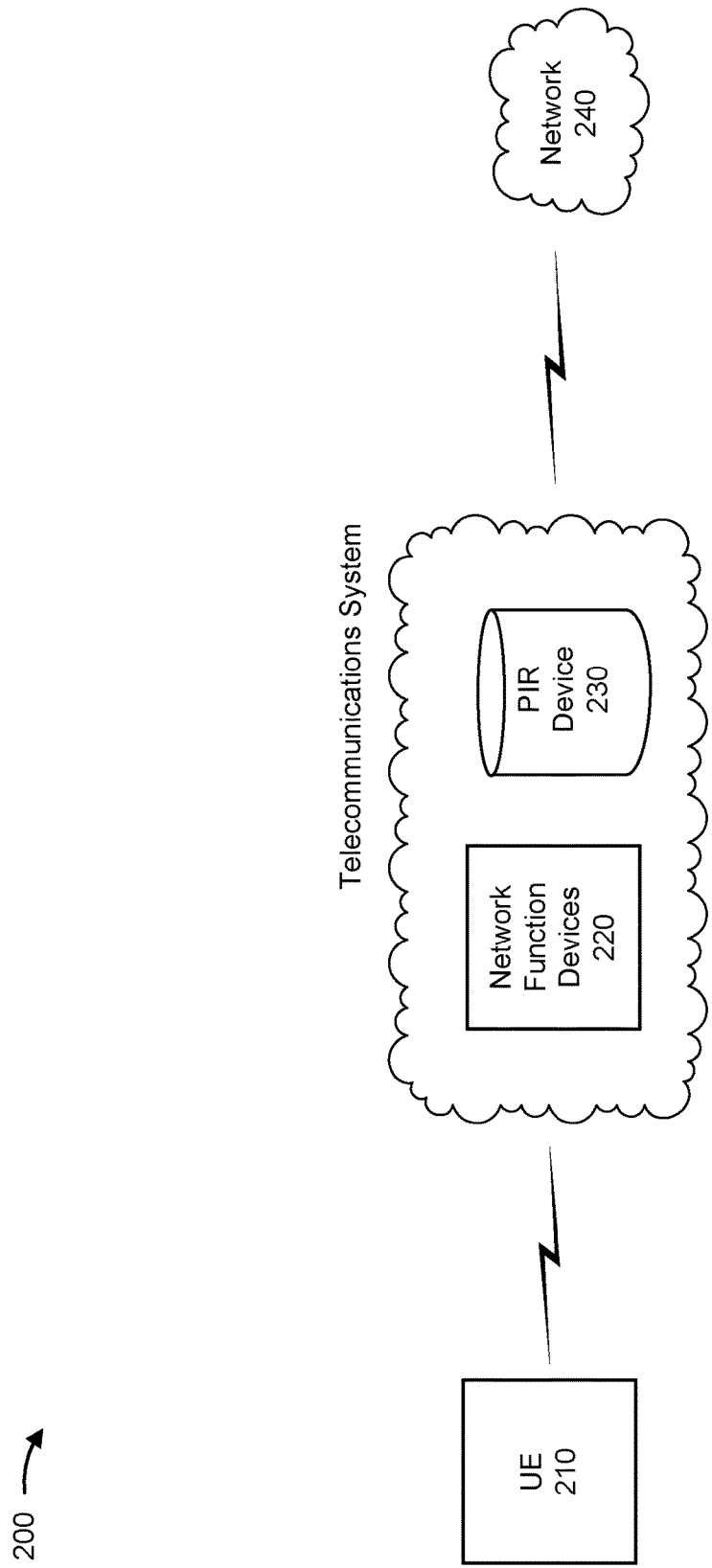
FIG. 2 is a diagram of an example environment in which devices described herein may be implemented.

FIG. 2 is a diagram of an example environment 200 in which systems, functional elements, and/or methods, described herein, may be implemented. As shown in FIG. 2, environment 200 may include a UE 210, a plurality of network function devices 220 (collectively referred to as "network function devices 220" and individually as "network function device 220") and a PIR device 230 included in a telecommunications system, a network 240, and/or the like. Devices of environment 200 may interconnect via wired connections, wireless connections, or a combination of wired and wireless connections.

In some implementations, network function devices 220 and PIR device 230 may interconnect in the telecommunications system via a management bus. In some implementations, the telecommunications system may include a 3G telecommunications system, a 4G telecommunications system, a long term evolution (LTE) telecommunications system, a LTE advanced (LTE-A) telecommunications system, a 5G telecommunications system, a New Radio (NR) telecommunications system, and/or the like.

UE 210 may include one or more devices capable of communicating with network function devices 220, PIR device 230, and/or network 240. For example, UE 210 may include a wireless communications device, a radiotelephone, a personal communications system (PCS) terminal (e.g., that may combine a cellular radiotelephone with data processing and data communications capabilities), a smart phone, a laptop computer, a tablet computer, a personal gaming system, a mobile hotspot device, a fixed wireless access device, a customer premises equipment, and/or a similar device. UE 210 may be capable of communicating using uplink (e.g., UE 210 to a base station included in the telecommunications system) communications, downlink (e.g., the base station to UE 210) communications, and/or sidelink (e.g., UE-to-UE) communications. In some implementations, UE 210 may include a machine-type communication (MTC) UE, such as an evolved or enhanced MTC (eMTC) UE. In some implementations, UE 210 may include an Internet of Things (IoT) UE, such as a narrowband IoT (NB-IoT) UE and/or the like. In some implementations, UE 210 may be capable of communicating using multiple radio access technologies (RATs).

Network function devices 220 may include one or more devices capable of communicating with UE 210, with PIR device 230, with network 240, and/or the like. In some implementations, network function devices 220 may include a radio access network (RAN) device (e.g., RAN device 102), a user plane function (UPF) device (e.g., UPF device 104), a session management function (SMF) device (e.g., SMF device) 106, an access and mobility management function (AMF) device (e.g., AMF device 108), a policy control function (PCF) device (e.g., PCF device 110), a lawful intercept (LI) device (e.g., LI device 112), a unified data management (UDM) device (e.g., UDM device 114), an authentication server function (AUSF) device (e.g., AUSF device 116), a charging function (CHF) device (e.g., CHF device 118), a network repository function (NRF) device (e.g., NRF device 120), and/or the like. In some implementations, network function devices 220 may be implemented on physical devices, such as a gateway, a mobility management entity, and/or the like. In some implementations, the hardware and/or software implementing network function devices 220 may be virtualized (e.g., through the use of network function virtualization and/or software-defined networking), thereby allowing for the use of composable infrastructure when implementing network function devices 220. In this way, networking, storage, and compute resources may be allocated to implement the functions of network function devices 220 (described in FIGS. 1A, 1B, and 2) in a flexible manner as opposed to relying on dedicated hardware and software to implement these functions.

In some implementations, the RAN device may include a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. The RAN device may transfer traffic between UE 210 (e.g., using a cellular RAT), one or more base stations included in the RAN device (e.g., using a wireless interface or a backhaul interface, such as a wired backhaul interface), and/or the like. The RAN device may provide one or more cells that cover geographic areas. In some implementations, some base stations included in the RAN device may be mobile base stations. In some implementations, some base stations included in the RAN device may be capable of communicating using multiple RATs.

In some implementations, the RAN device may perform scheduling and/or resource management for UEs 210 covered by the RAN device (e.g., UEs 210 covered by a cell provided by one or more base stations included in the RAN device). In some implementations, the RAN device may be controlled or coordinated by a network controller, which may perform load balancing, network-level configuration, and/or the like. The network controller may communicate with the RAN device via a wireless or wireline backhaul. In some implementations, the RAN device may include a network controller, a self-organizing network (SON) module or component, or a similar module or component. In other words, the RAN device may perform network control, scheduling, and/or network management functions. In some implementations, the RAN device may include a central unit and multiple distributed units. The central unit may coordinate access control and communication with regard to the multiple distributed units. The multiple distributed units may provide UEs 210 with access to network 240.

In some implementations, network function devices 220 may generate performance indicator data. In some implementations, network function devices 220 transmit the performance indicator data to PIR device 230 on the management bus via a service-based interface, which may include a RESTful API. In some implementations, network function devices 220 may publish one or more communications that include the performance indicator data. Network function devices 220 may publish the one or more communications to a message broker device, a message queue device, and/or the like, which may transmit the one or more published communications to PIR device 230.

PIR device 230 may include one or more devices capable of communicating with UE 210, with network function devices 220, with network 240, and/or the like. For example, PIR device 230 may include one or more devices capable of configuring a centralized performance indicator data store on the management bus, capable of receiving performance indicator data from network function devices 220 (e.g., directly from network function devices 220, via a message broker device, via a message queue device, and/or the like), capable of storing the performance indicator data in the centralized performance indicator data store, capable of performing one or more actions using the performance indicator data store in the centralized performance indicator data store, and/or the like.

Network 240 may include one or more wired and/or wireless data networks. For example, network 240 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
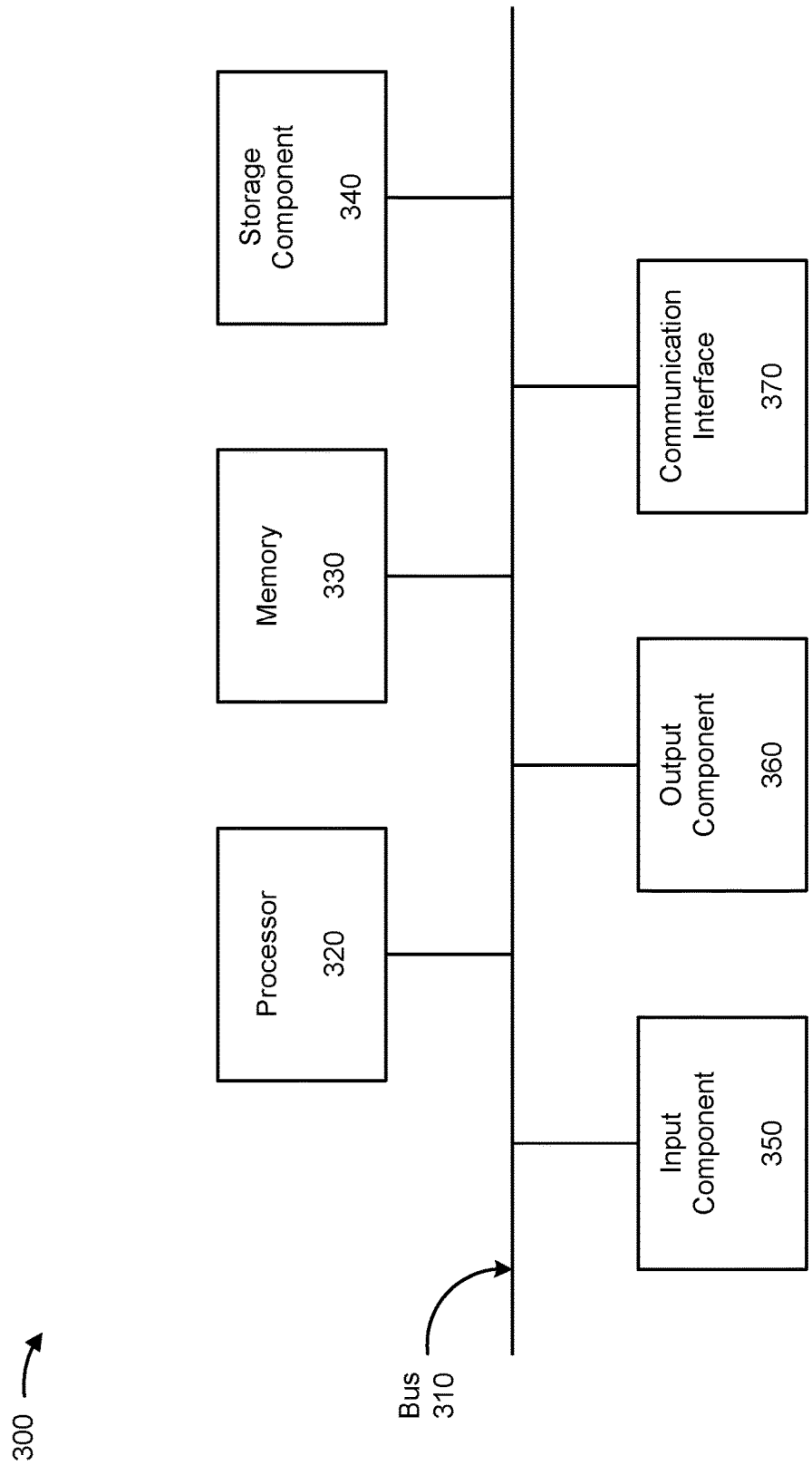
FIG. 3 is a diagram of example components of one or more devices of FIG. 2.

FIG. 3 is a diagram of example components of a device 300. Device 300 may correspond to, or may implement, one or more functional elements of, UE 210, network function devices 102-120, PIR device 122, network function devices 220, PIR device 230, and/or network 240. In some implementations, one or more functional elements of UE 210, network function devices 102-120, PIR device 122, network function devices 220, PIR device 230, and/or network 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performance indicator data retrieval and storage using a service-based interface. In some implementations, one or more process blocks of FIG. 4 may be performed by a PIR device (e.g., PIR device 122, PIR device 230, and/or the like), which may be included in a telecommunications system. In some implementations, one or more process blocks of FIG. 4 may be performed by another device or a group of devices separate from or including the PIR device, such as one or more network function devices (e.g., network function devices 102-120, network function devices 220, and/or the like) and/or the like.

As shown in FIG. 4, process 400 may include configuring a centralized performance indicator data store for a plurality of network function devices included in a telecommunications system, wherein the centralized performance indicator data store is accessible by the plurality of network function devices on a management bus of the telecommunications system via a service-based interface (block 410). For example, the PIR device (e.g., using processor 320, memory 330, storage component 340, output component 360, communication interface 370, and/or the like) may configure a centralized performance indicator data store for a plurality of network function devices included in a telecommunications system. In some implementations, the centralized performance indicator data store may be accessible by the plurality of network function devices on a management bus of the telecommunications system via a service-based interface. For example, the service-based interface may include a RESTful API.

As further shown in FIG. 4, process 400 may include subscribing the centralized performance indicator data store to a message class associated with performance indicator data that is generated by the plurality of network function devices (block 420). For example, the PIR device (e.g., using processor 320, memory 330, storage component 340, input component 350, output component 360, communication interface 370, and/or the like) may subscribe the centralized performance indicator data store to a message class associated with performance indicator data that is generated by the plurality of network function devices. The performance indicator data may be associated with various performance indicators, such as the performance indicators described above in connection with FIGS. 1A and 1B.

As further shown in FIG. 4, process 400 may include receiving, from the plurality of network function devices, one or more published communications associated with the message class, wherein the one or more published communications include the performance indicator data (block 430). For example, the PIR device (e.g., using processor 320, memory 330, storage component 340, input component 350, output component 360, communication interface 370, and/or the like) may receive, from the plurality of network function devices, one or more published communications associated with the message class, wherein the one or more published communications include the performance indicator data. The PIR device may receive the one or more published communications on the management bus via the service-based interface. The one or more published communications may be published via an OAM interface, of the plurality of network function devices, directly to the PIR device, to another device (e.g., a message broker device, a message queue device, and/or the like), and/or the like. When published to another device, the PIR device may automatically receive the one or more published communications from the other device, may request the other device to transmit the one or more published communications to the PIR device, and/or the like. As described above, the plurality of network function devices may be associated with a plurality of different OAM interfaces. Accordingly, the one or more published communications may be published via a plurality of different OAM interfaces.

As further shown in FIG. 4, process 400 may include storing the performance indicator data in the centralized performance indicator data store (block 440). For example, the PIR device (e.g., using processor 320, memory 330, storage component 340, input component 350, output component 360, communication interface 370, and/or the like) may store the performance indicator data in the centralized performance indicator data store.

Process 400 may include additional implementations, such as any single implementation or any combination of implementations described below and/or described with regard to any other process described herein.

In some implementations, the PIR device may filter the performance indicator data to generate a performance indicator data report, may perform call modeling in the telecommunications system using the performance indicator data stored in the centralized performance indicator data store, may adjust one or more operating parameters in the telecommunications system using the performance indicator data stored in the centralized performance indicator data store, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a PIR device (e.g., PIR device 122, PIR device 230, and/or the like) may reduce or eliminate the need for a network operator of a telecommunications system to include a plurality of element management systems in the telecommunications system to manage a plurality of network function devices (e.g., network function devices 102-120, network function devices 220, and/or the like), which decreases the complexity of the telecommunications system, decreases the cost and complexity of operating and maintaining the telecommunications system, and/or the like. Moreover, storing the performance indicator data generated by the plurality of network function devices in a centralized way allows the PIR device and/or another device to use the performance indicator data to identify and/or troubleshoot issues in the telecommunications system, to optimize one or more operating parameters of the telecommunications system, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more memories; and
  one or more processors, communicatively coupled to the one or more memories, to:
    configure a centralized performance indicator data store for a plurality of network function devices included in a telecommunications system,
      wherein the centralized performance indicator data store is accessible by the plurality of network function devices on a management bus of the telecommunications system via a service-based interface;
    subscribe the centralized performance indicator data store to a message class associated with performance indicator data that is generated by the plurality of network function devices;
    receive, from the plurality of network function devices, one or more published communications associated with the message class,
      wherein the one or more published communications include the performance indicator data,
      wherein the one or more processors, when receiving the one or more published communications, are to:
        receive first performance indicator data, generated by a first network function device of the plurality of network function devices, from the first network function device,
          wherein the first network function device uses a first operations, administration, and maintenance (OAM) interface, and
        receive second performance indicator data, generated by a second network function device of the plurality of network function devices, from the second network function device,
          wherein the second network function device uses a second, different OAM interface; and
    store the first performance indicator data and the second performance indicator data in the centralized performance indicator data store such that at least one of:
      the first performance indicator data is accessible by the second network function device using a first resource identifier, associated with the first performance indicator data, published by the first network function device using the second OAM interface, or
      the second performance indicator data is accessible by the first network function device using a second resource identifier, associated with the second performance indicator data, published by the second network function device using the first OAM interface.

2. The device of claim 1, wherein the service-based interface comprises:
  a representational state transfer (RESTful) application programming interface (API).

3. The device of claim 1, wherein the performance indicator data comprises at least one of:
  performance indicator data associated with an interception performance indicator,
  performance indicator data associated with a network resource usage performance indicator, or
  performance indicator data associated with a device resource usage performance indicator.

4. The device of claim 1, wherein the one or more processors, when receiving the one or more published communications associated with the message class, are to:
  receive the one or more published communications on the management bus via the service-based interface.

5. The device of claim 1, wherein the one or more processors are further to:
  perform, using the performance indicator data stored in the centralized performance indicator data store, at least one of:
    call modeling in the telecommunications system, or
    adjust one or more operating parameters in the telecommunications system.

6. The device of claim 1, wherein the one or more processors are further to:
  filter the performance indicator data to generate a performance indicator data report.

7. A method, comprising:
  configuring, by a performance indicator repository (PIR) device, a centralized performance indicator data store for a plurality of network function devices included in a telecommunications system,
    wherein the centralized performance indicator data store is accessible by the plurality of network function devices on a management bus of the telecommunications system via a service-based interface;
  subscribing, by the PIR device, the centralized performance indicator data store to a message class associated with performance indicator data that is generated by the plurality of network function devices;
  receiving, by the PIR device and from one or more of the plurality of network function devices, one or more published communications associated with the message class,
    wherein the one or more published communications include the performance indicator data,
    wherein receiving the one or more published communications comprises:

receiving first performance indicator data from a first network function device, of the plurality of network function devices,
  wherein the first network function device uses a first operations, administration, and maintenance (OAM) interface, and
receiving second performance indicator data from a second network function device, of the plurality of network function devices,
  wherein the second network function device uses a second, different OAM interface; and
storing, by the PIR device, the first performance indicator data and the second performance indicator data in the centralized performance indicator data store such that at least one of:
  the first performance indicator data is accessible by the second network function device using a first resource identifier, associated with the first performance indicator data, published by the first network function device using the second OAM interface, or
  the second performance indicator data is accessible by the first network function device using a second resource identifier, associated with the second performance indicator data, published by the second network function device using the first OAM interface.

8. The method of claim 7, wherein the one or more published communications are published via the first OAM interface and/or the second OAM interface.

9. The method of claim 7, wherein receiving the one or more published communications associated with the message class comprises:
  receiving the one or more published communications from a message broker device based on the centralized performance indicator data store being subscribed to the message class.

10. The method of claim 7, wherein the performance indicator data comprises at least one of:
  performance indicator data associated with a reliability performance indicator,
  performance indicator data associated with a reachability performance indicator, or
  performance indicator data associated with a mobility performance indicator.

11. The method of claim 7, wherein receiving the one or more published communications associated with the message class comprises:
  receiving the one or more published communications via the service-based interface on the management bus.

12. The method of claim 7, wherein the service-based interface includes a representational state transfer (RESTful) application programming interface (API).

13. The method of claim 7, further comprising at least one of:
  filtering, by the PIR device, the performance indicator data, stored in the centralized performance indicator data store, to generate a performance indicator data report, or
  performing, using the performance indicator data stored in the centralized performance indicator data store, at least one of:
    call modeling in the telecommunications system, or
    operation modelling in the telecommunications system.

14. A non-transitory computer-readable medium storing instructions comprising:
  one or more instructions that, when executed by one or more processors, cause the one or more processors to:
    configure a centralized performance indicator data store for a plurality of network function devices included in a telecommunications system,
      wherein the centralized performance indicator data store is accessible by the plurality of network function devices on a management bus of the telecommunications system via a service-based interface;
    subscribe the centralized performance indicator data store to a message class associated with performance indicator data that is generated by the plurality of network function devices;
    receive, from the plurality of network function devices, one or more published communications associated with the message class,
      wherein the one or more published communications are received on the management bus via the service-based interface, and
      wherein the one or more published communications include the performance indicator data,
      wherein the one or more instructions, that cause the one or more processors to receive the one or more published communications, cause the one or more processors to:
        receive first performance indicator data from a first network function device, of the plurality of network function devices, wherein the first network function device uses a first operations, administration, and maintenance (OAM) interface, and
        receive second performance indicator data from a second network function device, of the plurality of network function devices,
          wherein the second network function device uses a second, different OAM interface; and
    store the first performance indicator data and the second performance indicator data in the centralized performance indicator data store such that at least one of:
      the first performance indicator data is accessible by the second network function device using a first resource identifier, associated with the first performance indicator data, published by the first network function device using the second OAM interface, or
      the second performance indicator data is accessible by the first network function device using a second resource identifier, associated with the second performance indicator data, published by the second network function device using the first OAM interface; and
    perform, using the performance indicator data stored in the centralized performance indicator data store, at least one of:
      call modeling in the telecommunications system, or
      operation modelling in the telecommunications system.

15. The non-transitory computer-readable medium of claim 14, wherein the performance indicator data comprises at least one of:
  performance indicator data associated with a usage performance indicator,
  performance indicator data associated with a packet loss performance indicator, or
  performance indicator data associated with a throughput performance indicator.

16. The non-transitory computer-readable medium of claim 14, wherein the one or more published communications are published via the first OAM interface and/or the second OAM interface.

17. The non-transitory computer-readable medium of claim 14, wherein the one or more instructions, that cause the one or more processors to receive the one or more published communications associated with the message class, are to:
    receive the one or more published communications from a message broker device.

18. The non-transitory computer-readable medium of claim 14, wherein the one or more instructions, when executed by the one or more processors, further cause the one or more processors to:
    filter the performance indicator data, stored in the centralized performance indicator data store, to generate a performance indicator data report.

19. The device of claim 1, wherein the one or more processors are further to:
    determine that the one or more published communications have been added to a message queue of a message queue device; and
    transmit a request, to the message queue device, for the one or more published communications; and
    wherein the one or more processors, when receiving the one or more published communications associated with the message class, are to:
        receive the one or more published communications based on transmitting the request.

20. The non-transitory computer-readable medium of claim 14, wherein the one or more instructions, when executed by the one or more processors, further cause the one or more processors to:
    determine that the one or more published communications have been added to a message queue of a message queue device; and
    transmit a request, to the message queue device, for the one or more published communications; and
    wherein the one or more instructions, that cause the one or more processors to receive the one or more published communications associated with the message class, are to:
        receive the one or more published communications based on transmitting the request.

\* \* \* \* \*